(12) United States Patent
Shimonihara et al.

(10) Patent No.: US 10,322,646 B2
(45) Date of Patent: Jun. 18, 2019

(54) FUEL CELL VEHICLE

(71) Applicant: SUZUKI MOTOR CORPORATION, Hamamatsu-Shi, Shizuoka-Ken (JP)

(72) Inventors: Gaku Shimonihara, Hamamatsu (JP); Kengo Ikeya, Hamamatsu (JP); Yoshifumi Takai, Hamamatsu (JP)

(73) Assignee: Suzuki Motor Corporation (JP)

( * ) Notice: Subject to any disclaimer, the term of this patent is extended or adjusted under 35 U.S.C. 154(b) by 338 days.

(21) Appl. No.: 15/335,962

(22) Filed: Oct. 27, 2016

(65) Prior Publication Data

US 2017/0113566 A1 Apr. 27, 2017

(30) Foreign Application Priority Data

Oct. 27, 2015 (JP) .................. 2015-210392

(51) Int. Cl.
| | |
|---|---|
| *B60K 1/00* | (2006.01) |
| *B60L 11/18* | (2006.01) |
| *H01M 8/04014* | (2016.01) |
| *H01M 8/0662* | (2016.01) |
| *B60K 1/04* | (2019.01) |
| *B60K 7/00* | (2006.01) |
| *B60L 50/72* | (2019.01) |
| *B60K 15/03* | (2006.01) |
| *B60K 15/07* | (2006.01) |
| *H01M 16/00* | (2006.01) |
| *B60K 15/063* | (2006.01) |
| *H01M 8/1018* | (2016.01) |

(52) U.S. Cl.
CPC ............ *B60L 11/1883* (2013.01); *B60K 1/04* (2013.01); *B60K 7/0007* (2013.01); *B60L 50/72* (2019.02); *H01M 8/04014* (2013.01); *H01M 8/0662* (2013.01); *B60K 15/07* (2013.01); *B60K 2001/005* (2013.01);

(Continued)

(58) Field of Classification Search
CPC ...... B60L 11/00; B60L 11/18; B60L 11/1883; B60L 11/1881; B60L 11/1888; B60L 11/1892; B60L 11/1896; B60L 11/1898; B60K 2001/005; B60K 2001/003; B60K 6/32; B60K 13/00; B60K 13/04; B60K 13/06; H01M 8/0662; H01M 8/04014; H01M 8/06; H01M 8/04; H01M 8/00; H01M 8/04067; H01M 8/04074; H01M 8/04761; H01M 8/0668; H01M 2250/20
See application file for complete search history.

(56) References Cited

U.S. PATENT DOCUMENTS 6,715,571 B2 * 4/2004 Nakamori ................ B60K 1/04
180/233
7,699,127 B2 * 4/2010 Horii ....................... B62M 7/02
180/65.1

(Continued)

FOREIGN PATENT DOCUMENTS

| JP | 2000357529 A | 12/2000 |
|---|---|---|
| JP | 2010247574 A | 11/2010 |

OTHER PUBLICATIONS

Japanese Office Action corresponding to JP2015-210392, dated Dec. 25, 2018.

*Primary Examiner* — James M Dolak

(74) *Attorney, Agent, or Firm* — Barnes & Thornburg LLP

(57) ABSTRACT

A fuel cell vehicle provided with an exhaust duct structure is capable of reliably diluting hydrogen flowing into an exhaust duct. The fuel cell vehicle includes a vehicle body, an air-cooled fuel cell mounted in the vehicle body to generate power by allowing hydrogen gas and oxygen in air to react with each other, an exhaust duct through which exhaust air of the fuel cell is guided to a rear end of the vehicle body and is discharged outside the fuel cell vehicle, and a fan guiding air into the exhaust duct to dilute hydrogen in the exhaust duct.

4 Claims, 10 Drawing Sheets

(52) U.S. Cl.
CPC ............... *B60K 2001/0416* (2013.01); *B60K 2001/0433* (2013.01); *B60K 2007/0038* (2013.01); *B60K 2007/0092* (2013.01); *B60K 2015/03315* (2013.01); *B60K 2015/0634* (2013.01); *B60K 2015/0636* (2013.01); *B60L 2200/12* (2013.01); *B60Y 2200/126* (2013.01); *H01M 16/006* (2013.01); *H01M 2008/1095* (2013.01); *H01M 2250/20* (2013.01); *Y02T 90/32* (2013.01); *Y02T 90/34* (2013.01)

(56) References Cited

U.S. PATENT DOCUMENTS

| | | | | |
|---|---|---|---|---|
| 7,798,269 B2* | | 9/2010 | Makuta | H01M 8/2475 180/68.5 |
| 8,177,012 B2* | | 5/2012 | Horii | B62K 5/027 180/214 |
| 8,268,470 B2* | | 9/2012 | Matsumoto | B60K 11/06 180/309 |
| 8,820,451 B2* | | 9/2014 | Matsumoto | B60K 1/04 180/65.1 |
| 8,824,876 B2* | | 9/2014 | Ohtsuka | B60K 1/04 180/68.1 |
| 8,851,219 B2* | | 10/2014 | Yoshida | B60K 1/00 180/65.31 |
| 9,490,492 B2* | | 11/2016 | Yamamoto | H01M 8/04201 |
| 9,543,598 B2* | | 1/2017 | Otsuka | B60L 11/1898 |
| 9,705,140 B2* | | 7/2017 | Matsumoto | H01M 8/2484 |
| 9,758,056 B2* | | 9/2017 | Yamamoto | H01M 8/0485 |
| 9,758,215 B2* | | 9/2017 | Nagaya | B62M 7/12 |
| 9,905,878 B2* | | 2/2018 | Nishiyama | H01M 8/2475 |
| 9,947,945 B2* | | 4/2018 | Cusumano | H01M 8/04 |
| 10,160,346 B2* | | 12/2018 | Jung | B60L 11/1898 |
| 10,183,592 B2* | | 1/2019 | Haase | B60L 11/1892 |
| 10,195,958 B2* | | 2/2019 | Meitinger | B60L 1/08 |
| 2010/0258374 A1 | | 10/2010 | Tamura | |

* cited by examiner

FUEL CELL VEHICLE

CROSS-REFERENCE TO RELATED APPLICATIONS

This application claims the benefit of priority of Japanese Patent Application No. 2015-210392, filed on Oct. 27, 2015, the entire contents of which are incorporated herein by reference.

BACKGROUND OF THE INVENTION

Field of the Invention

The present invention relates to a fuel cell vehicle.

Description of the Related Art

There is known a fuel cell vehicle that travels by being driven by an electric motor powered by a fuel cell. Conventional fuel cell vehicles each have an exhaust duct structure including an exhaust duct connected to a rear side of a fan box provided with a fan for guiding air to a fuel cell. The exhaust duct is divided into a first exhaust duct through which air having cooled the fuel cell is guided, and a second exhaust duct avoiding a vehicle body frame and connected to a rear side of the first exhaust duct, the second exhaust duct discharging the air from the first exhaust duct from a rear end of a vehicle body therethrough.

The exhaust duct is used not only to discharge humid exhaust air emitted from the fuel cell during power generation, but also to dilute and discharge hydrogen discharged from an anode of the fuel cell at regular intervals to the outside of the fuel cell vehicle to maintain steady power generation of the fuel cell.

SUMMARY OF THE INVENTION

Unfortunately, an exhaust duct structure of a conventional fuel cell vehicle causes difficulty in allowing a cross-sectional shape of the exhaust duct to be identical throughout overall length of the exhaust duct as a matter of convenience of a shape of the vehicle body and a shape of the vehicle body frame.

The exhaust duct whose cross-sectional shape varies in a flowing direction as described above may cause a flow of hydrogen to partially stagnate to result in insufficient dilution of the hydrogen.

To solve the problems described above, it is an object of the present invention to provide a fuel cell vehicle provided with an exhaust duct structure capable of reliably diluting hydrogen, which is surplus hydrogen contained in exhaust air of a fuel cell, flowing into the exhaust duct.

To achieve the above object, an aspect of the present invention provides a fuel cell vehicle including a vehicle body, an air-cooled fuel cell mounted in the vehicle body to generate power by allowing hydrogen gas and oxygen in air to react with each other, an exhaust duct through which exhaust air of the fuel cell is guided to a rear end of the vehicle body and is discharged outside the fuel cell vehicle, and a fan guiding air into the exhaust duct to dilute hydrogen in the exhaust duct.

In preferred embodiments of the above aspect, the following modes may be provided.

It may be desired that the fan is provided in a lower portion of the exhaust duct, and is arranged to blow rearward of the vehicle body.

It may be further desired that a dilution accelerating wall provided inside the exhaust duct and facing the fan to disperse a flow generated by the fan into the exhaust duct for acceleration of dilution of hydrogen.

It may be desired that the fuel cell includes a surplus hydrogen exhaust pipe discharging unreacted surplus hydrogen. The exhaust duct includes a surplus hydrogen guide passage through which the surplus hydrogen is guided from the surplus hydrogen exhaust pipe into the exhaust duct, the surplus hydrogen being guided to above the fan and on an upstream side of a flow of exhaust air in the exhaust duct.

It may be desired that the fan is disposed in a central portion of the exhaust duct in a width direction of the vehicle body. The surplus hydrogen guide passage includes a tunnel cover covering a plurality of surplus hydrogen guide holes penetrating a wall of the exhaust duct to communicate with the surplus hydrogen exhaust pipe, the tunnel cover collecting the surplus hydrogen guided into the exhaust duct through the surplus hydrogen guide holes to collect the surplus hydrogen to a central portion of the exhaust duct in a width direction of the vehicle body, the tunnel cover including a plurality of exhaust holes.

This fuel cell vehicle provided with an exhaust duct structure is capable of reliably diluting hydrogen flowing into an exhaust duct.

DETAILED DESCRIPTION OF THE PREFERRED EMBODIMENT

Hereinafter, an embodiment of a fuel cell vehicle according to the present invention will be described with reference to FIGS. 1 to 10.

Figure 1:
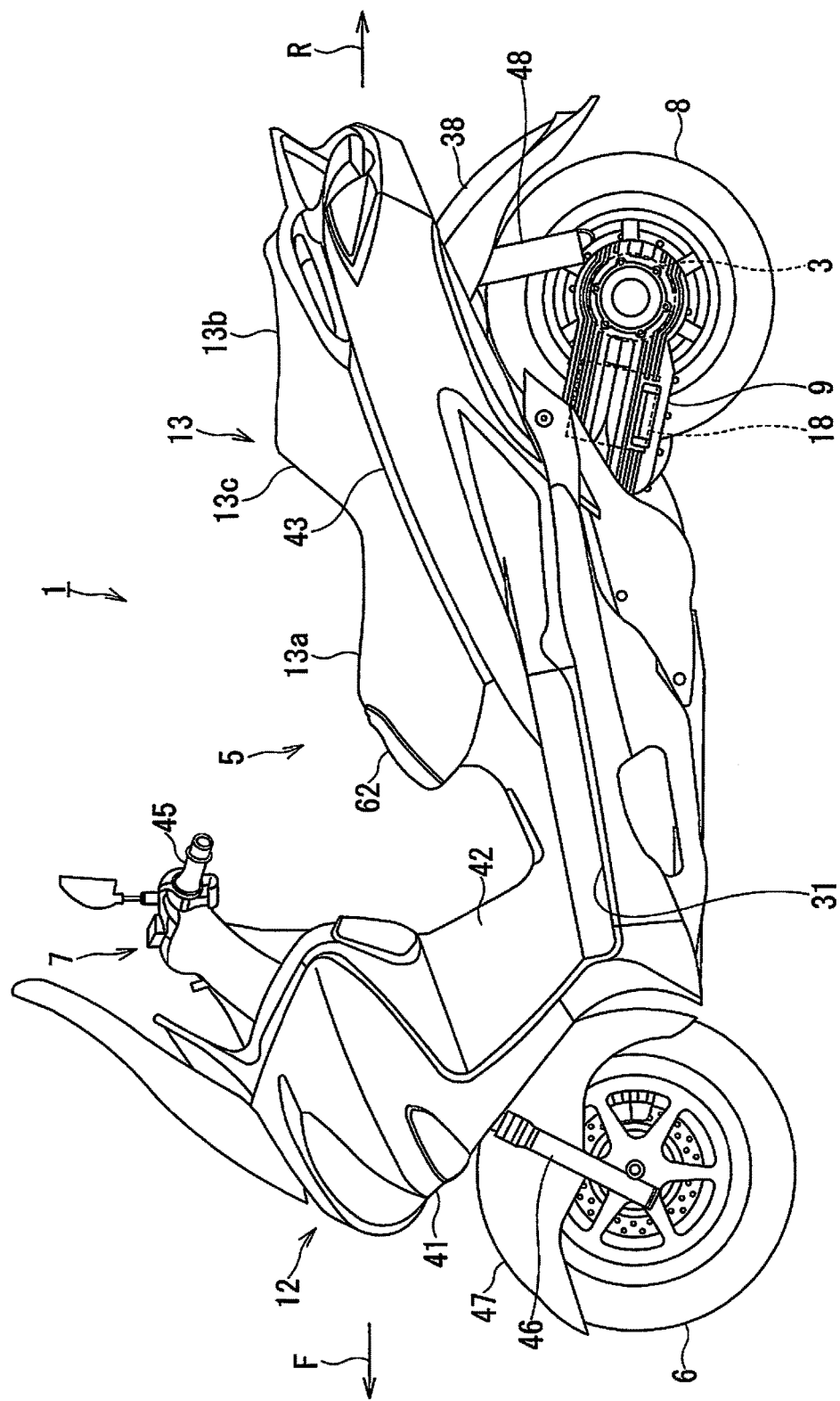
FIG. 1 is a left side view of a fuel cell vehicle according to an embodiment of the present invention.

FIG. 1 is a left side view of the fuel cell vehicle according to the embodiment of the present invention.

Figure 2:
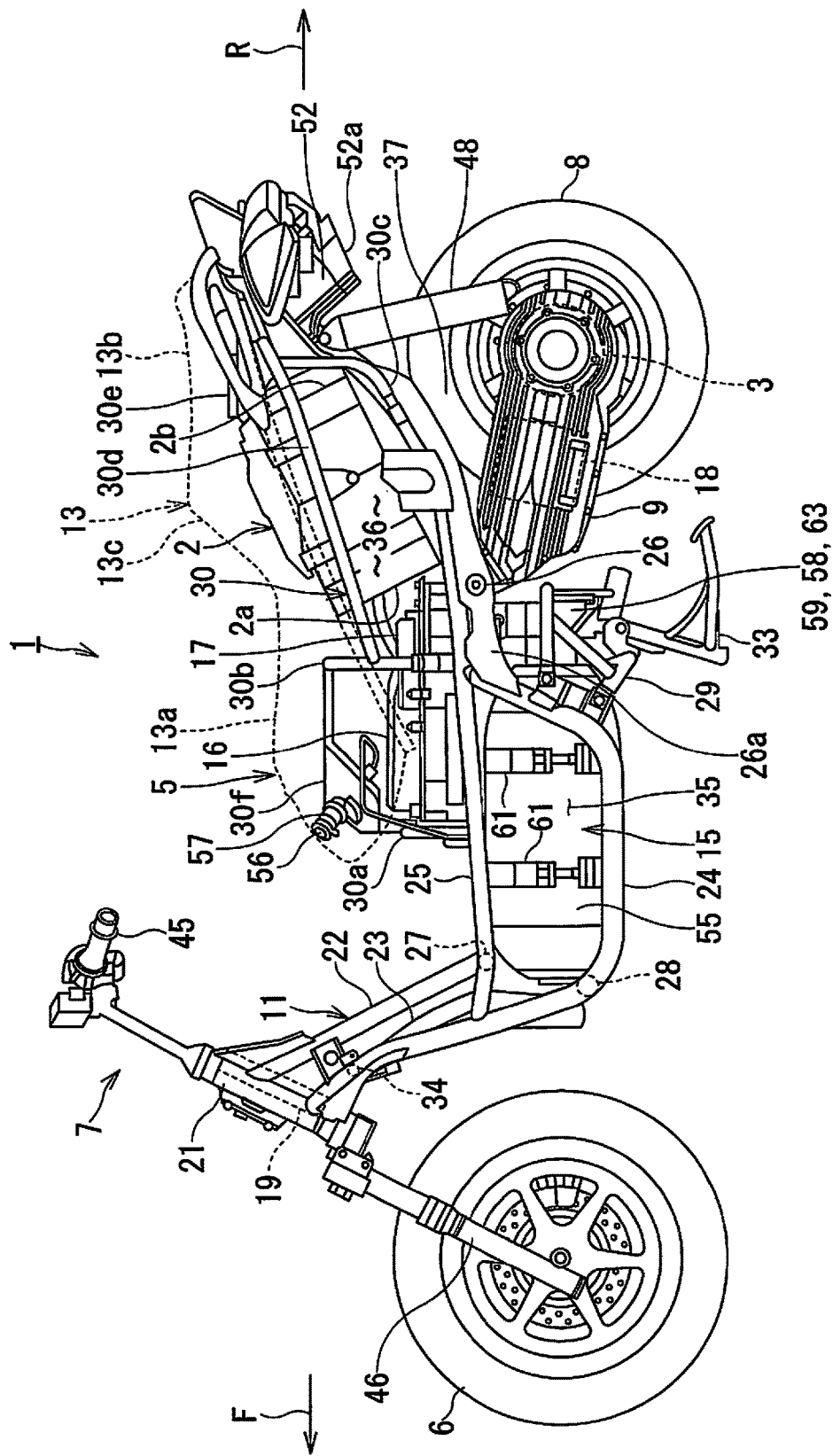
FIG. 2 is a left side view of the fuel cell vehicle according to the embodiment of the present invention, with its exteriors being detached.

FIG. 2 is a left side view of the fuel cell vehicle according to the embodiment of the present invention, with its exteriors, for example, covers and a seat being detached.

Figure 3:
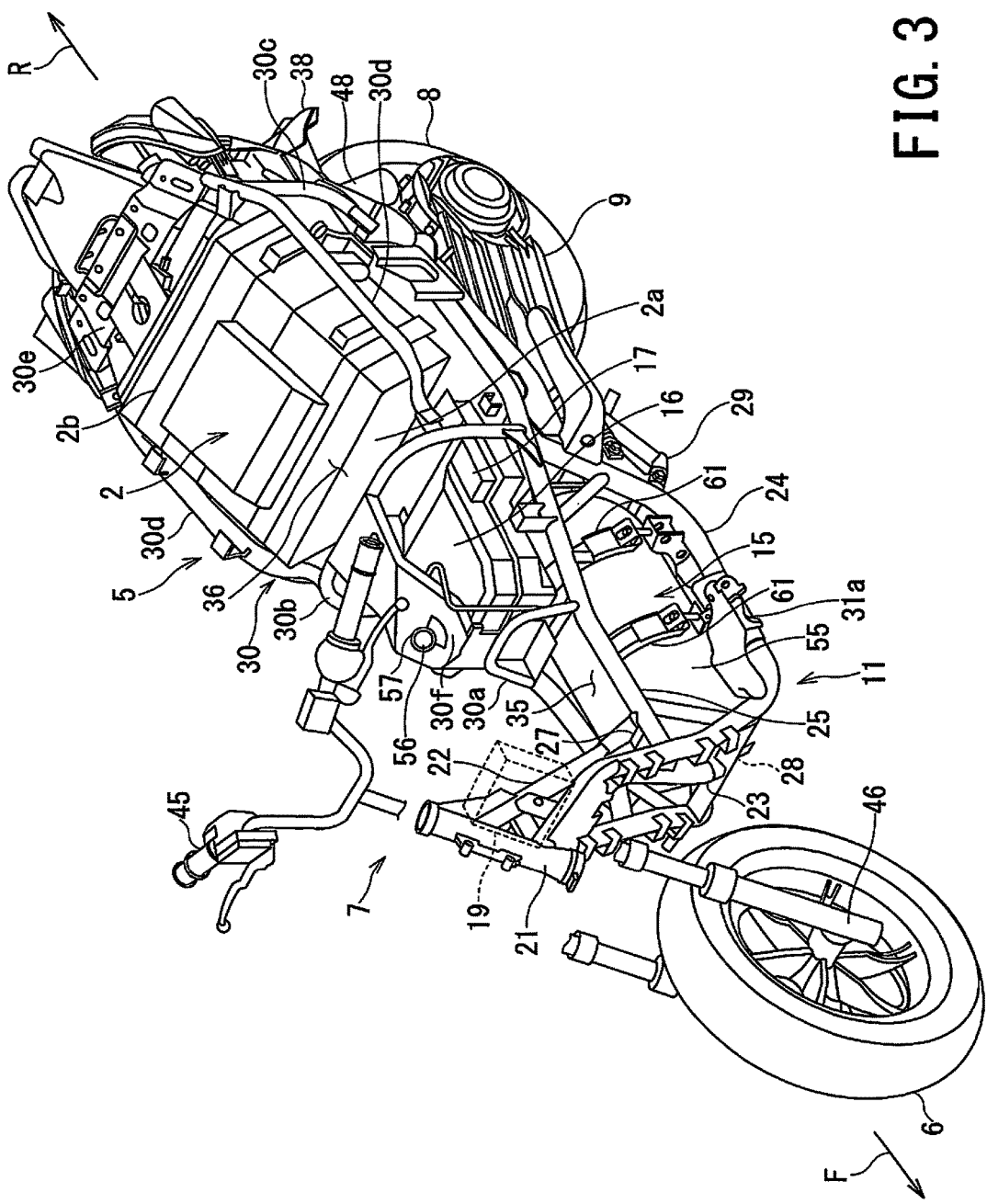
FIG. 3 is a perspective view of the fuel cell vehicle according to the embodiment of the present invention, with its exteriors being detached.

FIG. 3 is a perspective view of the fuel cell vehicle according to the embodiment of the present invention, with its exteriors, for example, covers and a seat being detached.

Note that expressions of front-and-rear, up-and-down, and left-and-right in the present embodiment are based on reference to a rider onboard a fuel cell vehicle 1. In FIGS. 1 to 3, a solid line arrow F represents forward of the fuel cell vehicle 1, and a solid line arrow R represents reward of the fuel cell vehicle 1.

As shown in FIGS. 1 to 3, the fuel cell vehicle 1 according to the present embodiment travels by being driven by an electric motor 3 powered by a fuel cell 2. The fuel cell vehicle 1 is a motorcycle of scooter type, and also a fuel cell powered bicycle traveling by the power of the fuel cell 2. The fuel cell vehicle 1 may be a tricycle.

The fuel cell vehicle 1 includes a vehicle body 5 extending forward and rearward, a front wheel 6 as a steered wheel, a steering mechanism 7 supporting the front wheel 6 in a steerable manner, a rear wheel 8 as a driving wheel, a swing arm 9 supporting the rear wheel 8 so as to be swingable in the up and down direction, and the electric motor 3 which generates driving power of the rear wheel 8.

The vehicle body 5 includes a frame 11 extending forward and rearward of the vehicle, an exterior 12 covering the frame 11, and a seat 13 disposed above a rear half part of the frame 11.

Further, the vehicle body 5 includes a fuel cell 2, a fuel tank 15 configured to store high pressure gas of hydrogen as a fuel to be used for power generation in the fuel cell 2, a rechargeable battery 16 configured to supplement power of the fuel cell 2, a power management apparatus 17 configured to adjust output voltage of the fuel cell 2 and control power distribution between the fuel cell 2 and the rechargeable battery 16, an inverter 18 configured to convert DC power outputted by the power management apparatus 17 into three-phase AC power and outputs it to the electric motor 3 to operate the electric motor 3, and a vehicle controller 19 configured to comprehensively control those mentioned before.

A power train of the fuel cell vehicle 1 includes the fuel cell 2 and the rechargeable battery 16, is a system which appropriately utilizes power of each power supply depending on travelling conditions of the vehicle, power generation conditions of the fuel cell 2, and power storage conditions of the rechargeable battery 16. The fuel cell vehicle 1 generates regenerative power at the electric motor 3 during deceleration. The rechargeable battery 16 and the fuel cell 2, which are power sources of the vehicle, are connected in parallel to the inverter 18 and supply power to the electric motor 3. The rechargeable battery 16 stores regenerative power generated at the electric motor 3 when the fuel cell vehicle 1 decelerates, and power generated by the fuel cell 2.

The frame 11 is made up of a plurality of steel hollow pipes combined into a single body. The frame 11 includes a head pipe 21 disposed above the front end of the frame 11, an upper down-frame 22 extending from a central part of the head pipe 21 in a rearwardly and downwardly inclined manner, a lower down-frame 23 disposed below the head pipe 21 and extending in a rearwardly and downwardly inclined manner, a pair of left and right upper frames 24, a pair of left and right upper frames 25, a pivot shaft 26, an upper bridge frame 27, a lower bridge frame 28, a guard frame 29, and a mounted-instrument protection frame 30.

The head pipe 21 supports the steering mechanism 7 so as to be steerable, that is, to be swingable in the left and right direction of the fuel cell vehicle 1.

The pair of left and right lower frames 24 are disposed in the left and the right of the lower down-frame 23 and connected to a lower part of the head pipe 21. The pair of left and right lower frames 24 each include a front-side inclined portion extending from a connected portion with the head pipe 21 substantially in parallel along the lower down-frame 23 and in a rearwardly and downwardly inclined manner, a front-side curved portion curved rearwardly at a lower end of the front-side inclined portion, and a straight portion extending substantially horizontally from a rear end of the front-side curved portion toward rearward of the vehicle body 5 in a linear manner until reaching a central portion of the vehicle body 5, that is, a central portion in the front and rear direction of the fuel cell vehicle 1. The pair of left and right lower frames 24 each include a rear-side curved portion curved toward rearward and upward from a rear end part of the straight portion, a rear-side inclined portion extending from an upper end part of the rear-side curved portion in a rearwardly and upwardly inclined manner, and an upper and lower frame joining part connecting the rear-side inclined portion to the upper frame 25. Spacing between the left and right lower frames 24 is wider than that between the left and right upper frames 25.

A near-head-pipe bridge frame 34 is constructed between upper parts of the left and right lower frames 24. The near-head-pipe bridge frame 34 extends in a linear manner substantially in the left and right direction of the fuel cell vehicle 1. Each of the left and right lower frames 24 includes a foot rest bracket 31a. The foot rest bracket 31a supports a foot board 31, which is disposed on the outer side of the front-side curved portion, from below. A rider can lay its foot on the foot board 31.

The lower frame 24 being disposed on the left side of the vehicle body 5 includes a side stand bracket (not shown). The side stand bracket (not shown) is provided with a side stand (not shown) configured to make the fuel cell vehicle 1 stand by itself in a leftwardly inclined manner. The side stand swings between an erected position for making the fuel cell vehicle 1 stand by itself, and a retracted position for making it stay along the vehicle body 5 so as not to impede travelling.

The pair of left and right upper frames 25 are connected to a central part in the up-and-down direction of the front-side inclined portion of the lower frame 24 in a front half part of the vehicle body 5. The pair of left and right upper frames 25 each include, horizontal portions extending from a connected portion with the front-side inclined portion of the lower frame 24 toward rearward of the vehicle body 5 in a substantially horizontal manner, and rear end parts being rear ends of the horizontal portions of the pair of left and right upper frames 25, the rear end parts being significantly inclined rearwardly and upwardly in the rear half part of the vehicle body 5 and above the rear wheel 8, the rear end parts curved inwardly in the left and right direction of the vehicle body 5 to come close to each other to an extent of about thickness (width size) of the rear wheel 8.

The pivot shaft 26 is constructed between the left and right upper frames 25 in the rear half part of the vehicle body 5. The pivot shaft 26 is constructed between a pair of left and right brackets 26a. Each of the brackets 26a is located below the upper frame 25 and in the rear of a merging portion (upper and down frame joining part) between the upper frame 25 and the lower frame 24. Each of the brackets 26a is connected to the horizontal portion of the upper frame 25, and to the rear-side inclined portion of the lower frame 24.

The upper bridge frame 27 is constructed between the front end parts of the left and right upper frames 25. The upper bridge frame 27 extends substantially linearly in the left and right direction of the vehicle between the left and right upper frames 25 to interconnect the left and right upper frames 25.

The lower bridge frame 28 is constructed between the front-side curved portions of the left and right lower frames 24. The lower bridge frame 28 extends substantially linearly in the left and right direction of the vehicle between the left and right lower frames 24 to interconnect the left and right lower frames 24.

The guard frame 29 is constructed between the rear-side curved portions of the left and right lower frames 24. The guard frame 29 extends rearwardly and downwardly from a connected portion with the left and right lower frames 24, and extends into a rearwardly declined U-shape so as to enlarge the internal space of the frame 11. The guard frame 29 is provided with a center stand 33 configured to make the fuel cell vehicle 1 stand by itself in an upright state. The center stand 33 swings between an erected position for making the fuel cell vehicle 1 stand by itself, and a retracted position for making it stay along the vehicle body 5 so as not to impede travelling.

The upper down-frame 22 is constructed between the head pipe 21 and the upper bridge frame 27.

The lower down-frame 23 includes an upper end part connected to a central part in the left and right direction of the fuel cell vehicle 1 of a near-head-pipe bridge frame 34 constructed between the left and right lower frames 24, and a lower end part connected to a central part in the left and right direction of the fuel cell vehicle 1 of the lower bridge frame 28.

The mounted-instrument protection frame 30 is provided above the rear half part of the upper frame 25. The mounted-instrument protection frame 30 supports and secures the fuel cell 2 to the fuel cell vehicle 1. A part of the mounted-instrument protection frame 30 can be attached and detached to and from the upper frame 25.

The seat 13 extends forward and rearward covering an upper section of the rear half part of the frame 11. The seat 13 is of a tandem type and includes a front half part 13a on which the rider is to be seated, a rear half part 13b on which a passenger is to be seated, and an inclined part 13c between the front half part 13a and the rear half part 13b.

Here, a space surrounded by the left and right upper frames 25 and the left and right lower frames 24 is referred to as a center tunnel region 35. A space surrounded by the rear half part of the upper frame 25, exterior 12, and the seat 13 as an instrument mounting region 36. A space in the rear of the center tunnel region 35 and below the instrument mounting region 36 as a tire house region 37.

The center tunnel region 35 accommodates the fuel tank 15. In the fuel cell vehicle 1 of a motor-scooter type according to the present embodiment, the center tunnel region 35 is disposed along the front and rear direction of the fuel cell vehicle 1 and between left and right foot boards 31 on which the rider places its foot, and rises higher than the foot board 31 such that the foot resting region of the foot board 31 is divided into left and right sections. In other words, the foot board 31, which serves as the foot resting region, is disposed in the left and right of the center tunnel region 35, and the fuel tank 15 is disposed between the left and right foot boards 31.

The instrument mounting region 36 accommodates the rechargeable battery 16, the power management apparatus 17, and the fuel cell 2 in this order from the front side of the vehicle body 5. The mounted-instrument protection frame 30 protects the front end part, the central part, the rear end part, and a side part ranging from the central part to the rear end part of the instrument mounting region 36.

The mounted-instrument protection frame 30 surrounds the instrument mounting region 36 and protects instruments to be mounted in the instrument mounting region 36. The mounted-instrument protection frame 30 includes a front protection frame 30a disposed in the front end part of the instrument mounting region 36, the front protection frame 30a being constructed between the left and right upper frames 25 in an upwardly convex arch shape, a center protection frame 30b disposed in a central part of the instrument mounting region 36 and in the rear of a merging spot between the upper frame 25 and the lower frame 24, the center protection frame 30b being constructed between the left and right upper frames 25 in an upwardly convex arch shape, a pair of left and right rear protection frames 30c disposed at a rear end part of the instrument mounting region 36, the pair of left and right rear protection frames 30c being connected to a portion where each of the left and right upper frames 25 is curved inwardly, the pair of left and right rear protection frames 30c extending rearward and obliquely upward from the curved portion, a pair of left and right side protection frames 30d extending rearward from each of the left and right of the center protection frame 30b to be connected to the upper end parts of the rear protection frames 30c, the pair of left and right side protection frames 30d reaching the rear end part of the vehicle body 5, a bracket 30e constructed between rear end parts of the left and right side protection frames 30d.

The left and right upper frames 25 are bent at a spot where the lower ends of the front protection frame 30a are joined thereto, increase the spacing therebetween toward the rear of the fuel cell vehicle 1. The left and right upper frames 25 are bent at a spot where the lower ends of the center protection frame 30b are joined thereto, and extend to the rear of the fuel cell vehicle 1. Thus, the center protection frame 30b has a larger width and a larger height than those of the front protection frame 30a. The rear protection frame 30c and the pair of the left and right side protection frames 30d are integrated.

The rear protection frame 30c and the pair of left and right side protection frames 30d are detachably interconnected to the center protection frame 30b and the upper frames 25, thereby supporting the fuel cell 2.

A rear wheel 8 is disposed in the tire house region 37.

Between the instrument mounting region 36 and the tire house region 37, a rear fender 38 as a partition member for dividing respective regions is provided.

The exterior 12 includes, a front leg-shield cover 41 covering a front half part of the vehicle body 5, a front frame cover 42 disposed above the center of the vehicle body 5 and covering an upper section of the upper frame 25 such as the center tunnel region 35, and a frame cover 43 disposed in a rear half part of the vehicle body 5 and covering a lower portion of the seat 13.

The frame cover 43 along with the seat 13 surrounds the instrument mounting region 36. The instrument mounting region 36 is a closed space surrounded by the seat 13, the frame cover 43, and the rear fender 38. The instrument mounting region 36 easily and securely controls flow of air to the fuel cell 2 by means of a vent hole (not shown) provided in an appropriate area of the frame cover 43 or the rear fender 38, and also easily and securely controls flow of air as a cooling wind to an apparatus, which needs to be cooled. The instrument mounting region 36 allows air to enter from, for example, a joint of each cover (such as the front frame cover 42, and a frame cover 43).

The steering mechanism 7 is disposed in a front section of the vehicle body 5 and swings in the left and right direction centering on the head pipe 21 of the frame 11, thereby enabling steering of the front wheel 6. The steering mechanism 7 includes a handle 45 provided in a top part, and a pair of left and right front forks 46 interconnecting the handle 45 and the front wheel 6, and the pair of left and right front forks 46 extending in the up and down direction slightly inclined rearwardly. The left and right front forks 46 have a telescopic structure that can be elastically expanded and contracted. An axle (not shown) for rotatably supporting the front wheel 6 is constructed between lower end parts of the left and right front forks 46. The front fender 47 is disposed above the front wheel 6. The front fender 47 is located between the left and right front forks 46, and secured to the front fork 46.

The front wheel 6 is a driven wheel that is rotatable about the axle constructed between the lower end parts of the left and right front forks 46.

The swing arm 9 swings in the up and down direction about the pivot shaft 26 as a rotational center extending in the left and right direction of the vehicle body 5. The swing arm 9 rotatably supports the rear wheel 8 between a pair of arms extending in the front and rear direction on left and right sides of the vehicle body 5, respectively. A rear suspension 48 is constructed between the frame 11 and the swing arm 9. The upper end part of the rear suspension 48 is swingably supported at the rear end part of the upper frame 25. The lower end part of the rear suspension 48 is swingably attached to the rear end part of the swing arm 9. The rear suspension 48 buffers the swinging of the swing arm 9.

The swing arm 9 accommodates the electric motor 3 rotationally driving the rear wheel 8, and an inverter 18 converting DC power supplied from the fuel cell 2 into AC power to supply it to the electric motor 3.

The electric motor 3 rotationally drives the rear wheel 8 with power supplied from the fuel cell 2 or the rechargeable battery 16, thereby causing the fuel cell vehicle 1 to travel. The electric motor 3 is accommodated in a rear part of the swing arm 9 and coaxially disposed with the axle of the rear wheel 8. The electric motor 3 is integrally assembled to the swing arm 9 to constitute a unit-swing-type swing arm.

The inverter 18 is accommodated in a front part of the swing arm 9, and disposed between the pivot shaft 26 and the electric motor 3. The inverter converts DC power outputted by the power management apparatus 17 into three-phase AC power, and adjusts the rotational speed of the electric motor 3 by altering the frequency of the AC power.

The rear wheel 8 is the driving wheel being supported by the axle (not shown) to which driving force is transferred from the electric motor 3.

The fuel cell 2 generates power by causing reaction between a fuel and an oxidizing agent. The fuel cell 2 is an air-cooled fuel cell system generating power by using a high pressure gas, for example, hydrogen gas as the fuel, and oxygen in the air as the oxidizing agent, and is cooled by using air.

The fuel cell 2 is disposed on the rear half side of the instrument mounting region 36. The fuel cell 2 is disposed below the seat 13 over a range from an inclined part between the front half part 13a and rear half part 13b to the rear half part 13b. That is, in the side view of the vehicle, the fuel cell 2 is disposed between the rear half part 13b of the seat 13, on which the passenger is to be seated, and the rear wheel 8 and the swing arm 9.

The fuel cell 2 has a cuboidal shape having a long side extending in the front and rear direction of the vehicle body 5, and is disposed in the instrument mounting region 36 in a posture in which its front face, in which the intake port 2a is disposed, faces forward and obliquely downward, and its back face, in which the exhaust port 2b is disposed, faces rearward and obliquely upward. That is, the fuel cell 2 is secured to the frame 11 in a forward leaning posture in which its front side is located lower than its rear side. The upper part of the fuel cell 2 is secured to a mounted instrument protection frame 30 and the lower part of the fuel cell 2 is secured to the upper frame 25.

The fuel cell 2 includes a plurality of flat modules interconnected from the front side toward the rear side. The fuel cell 2 includes a filter (not shown), an intake shutter (not shown), a fuel cell stack (not shown), a fan (not shown), and an exhaust shutter (not shown), which are interconnected by being superposed on each other in a laminated state in order from the front side. A fuel cell control unit (not shown) is provided on the top face of the fuel cell 2.

The intake shutter includes an openable/closable intake port 2a of air, and configured to control the amount of air introduced to the fuel cell stack by opening/closing the intake port 2a. The intake shutter configured to constitute a circulation path for circulating air in the fuel cell 2 by closing the intake port 2a. The exhaust shutter includes an openable/closable exhaust port 2b of air and configured to constitute the circulation path for circulating air in the fuel cell 2 by closing the exhaust port 2b. In other words, the fuel cell 2 includes the openable/closable intake port 2a in the front face, and the openable/closable exhaust port 2b in the back face, and configured to cause air to be circulated in the fuel cell 2 by closing the intake port 2a and the exhaust port 2b.

The fuel cell stack causes electrochemical reaction between oxygen contained in the air drawn through the intake port and hydrogen supplied from the fuel tank 15 to generate power, and produces a wet excess gas after generation.

The fan generates intake negative pressure for drawing air in the instrument mounting region 36 from the intake port into the fuel cell 2, while drawing out the excess gas from the fuel cell stack and discharges it from the exhaust port. The flow of air being caused by the fan is used for the power generation in the fuel cell stack, as well as for the cooling of the fuel cell 2.

An exhaust duct 52 is provided in the rear of the fuel cell 2. The fan of the fuel cell 2 draws out excess gas from the fuel cell stack and discharges it to the exhaust duct 52. The front end part of the exhaust duct 52 is airtightly connected to a box, which is a frame body of the exhaust shutter, of the fuel cell 2. The exhaust duct 52 includes an exhaust port 52a opened toward rearwardly downward, and rearwardly upward at the rear end of the vehicle body 5. The exhaust duct 52 guides exhaust gas (excess gas) ejected from the fan of the fuel cell 2 to the exhaust port 52a and discharges it to the rear of the vehicle body 5.

The exhaust port 52a is disposed higher than the exhaust face (back face), and preferably at the upper end part of the rear section of the exhaust duct 52. In other words, the upper edge part of the exhaust port 52a is disposed at a position higher than the exhaust port of the fuel cell 2. As a result of having the exhaust port 52a disposed to be higher than the exhaust face (back face) of the fuel cell 2, the exhaust duct 52 guides a wet excess gas containing unreacted hydrogen gas to the exhaust port 52a and securely discharge it from the vehicle body 5.

The fuel tank 15 is a high-pressure compressed hydrogen storage system. The fuel tank 15 includes a pressure vessel 55 made of carbon fiber reinforced plastic (CFRP), or being a composite vessel made from an aluminum liner, a fuel filling joint 57 having a fuel filling port 56, a fuel filling main valve 58, a fuel supply main valve 59 integrally including a shut-off valve (not shown) and a regulator (not shown), and a secondary pressure reducing valve (not shown).

The pressure vessel 55 is a composite vessel made from an aluminum liner which stores hydrogen gas as fuel of the fuel cell 2. The fuel tank 15 stores, for example, hydrogen gas of about 70 megapascal (MPa.) The pressure vessel 55 includes a cylinder-shaped barrel part, and a dome-shaped mirror plate provided on front and rear end faces of the barrel part. The pressure vessel 55 is disposed in the center tunnel region 35 with the central axis of the cylindrical barrel being aligned along the front and rear direction of the vehicle body 5. The pressure vessel 55 is surrounded by a pair of upper frames 25, a pair of lower frames 24, a lower bridge frame 28, and a guard frame 29, and is robustly protected against load due to turning over or collision of the fuel cell vehicle 1.

The pressure vessel 55 is supported in the center tunnel region 35 by a clamp band 61 constructed between an upper frame 25 disposed at one side of the vehicle body 5, for example, the upper frame 25 disposed at the right side of the vehicle body 5, and a lower frame 24 disposed at another side of the vehicle body, for example, the lower frame 24 disposed at the left side of the vehicle body 5. The pressure vessel 55 is placed on a lower clamp band, for example, a lower half part of the clamp band 61 being constructed between the right side upper frame 25 and an left side lower frame 24, and is clamped by the upper clamp band, for example, an upper half part of the clamp band 61 to be sandwiched. Note that the clamp band 61 may be constructed between the upper frame 25 disposed at the left side of the vehicle body 5 and the lower frame 24 disposed at the right side of the vehicle body 5.

The fuel filling joint 57 is disposed outside of the center tunnel region 35, more specifically, rearwardly upward of the center tunnel region 35, and at the front end part of the instrument mounting region 36. The fuel filling joint 57 is disposed to be higher than or just above the rechargeable battery 16. The fuel filling joint 57 is secured to the joint bracket 30f being constructed between the upper parts of the front protection frame 30a and the center protection frame 30b of the mounted-instrument protection frame 30. The fuel filling joint 57 extends toward upward, and slightly leftward of the vehicle body 5 such that a facility side joint can be inserted from the upper side and left side of the vehicle body at the time of fuel filling. The fuel filling joint 57 is covered and hidden by the fuel filling port lid 62 being disposed at the front end of the seat 13. The fuel filling port lid 62 is supported to the seat 13 via a hinge mechanism (not shown), and opens/closes by being swung. The fuel filling joint 57 has a fuel filling port 56 as an inlet for introducing high pressure gas of hydrogen as a fuel into the fuel tank 15.

The fuel filling port 56 is disposed at a top part of the fuel filling joint 57. The fuel filling port 56 is oriented toward the upper left of the vehicle body 5. In filling the fuel tank 15 with fuel, the upward of the fuel filling port 56 is opened to the atmosphere in a state in which the fuel filling port lid 62 is opened. Thus, in charging high pressure gas, for example, hydrogen gas as fuel, into the fuel tank 15, even if the high pressure gas leaks, the leaked fuel diffuses toward the upward of the fuel cell vehicle 1 without residing therein.

A fuel filling main valve 58 and a fuel supply main valve 59 are integrated and incorporated in a tank valve 63 provided on the top part of the rear-side mirror plate of the pressure vessel 55. The tank valve 63 is disposed in a space surrounded by the guard frame 29. The fuel supply main valve 59 includes a shut-off valve (not shown) and a primary pressure reducing valve (not shown). The fuel filling main valve 58 and the shut-off valve of the fuel supply main valve 59 are an on-off valve using an electromagnetic valve. The primary pressure reducing valve and the secondary pressure reducing valve of the fuel supply main valve 59 successively reduce and thereby adjust the pressure of the high pressure fuel gas from the pressure vessel 55.

The rechargeable battery 16 is a box-shaped lithium ion battery. The rechargeable battery 16 is disposed in the front end part of the instrument mounting region 36 and between the rear half part of the pressure vessel 55, that is, the rear half part of the cylindrical barrel and the rear-side mirror plate, and the front half part 13a of the seat 13.

Note that, the fuel cell vehicle 1 includes, besides the rechargeable battery 16, a second rechargeable battery (not shown) supplying, for example, 12V-based power as a power supply for meters (not shown) and lights (not shown). The second rechargeable battery is disposed around the head pipe 21, for example, beside the right side of the head pipe 21.

In the fuel cell vehicle 1, even if hydrogen gas as fuel leaks from the fuel filling port 56, the hydrogen gas, which is lighter than air, moves up, thus diffusing to the outside of the fuel cell vehicle 1 without residing within the fuel cell vehicle 1. Even if hydrogen gas as fuel leaks from the fuel filling main valve 58 or the fuel supply main valve 59, the hydrogen gas moves toward the tire house region 37, thus diffusing to the outside of the fuel cell vehicle 1 without residing within the fuel cell vehicle 1.

The power management apparatus 17 is disposed between the rechargeable battery 16 and the fuel cell 2 in the instrument mounting region 36, and is secured to the frame 11. Note that the power management apparatus 17 may be disposed along with the rechargeable battery 16 in a same waterproof case.

By disposing the rechargeable battery 16, the power management apparatus 17, and the fuel cell 2 in a manner as described above, it becomes possible to dispose apparatuses adjoining to each other in the electrical connection to be closer to each other as much as possible, thus shortening the wiring length between the apparatuses, and reducing the weight relating to the wiring.

The vehicle controller 19 is disposed around the head pipe 21 being a relatively high place in the fuel cell vehicle 1, for example, beside the left side of the head pipe 21 corresponding to the opposite side of the second rechargeable battery, which supplies 12V-based power.

Next, an exhaust duct structure of the fuel cell vehicle 1 will be described in detail.

Figure 4:
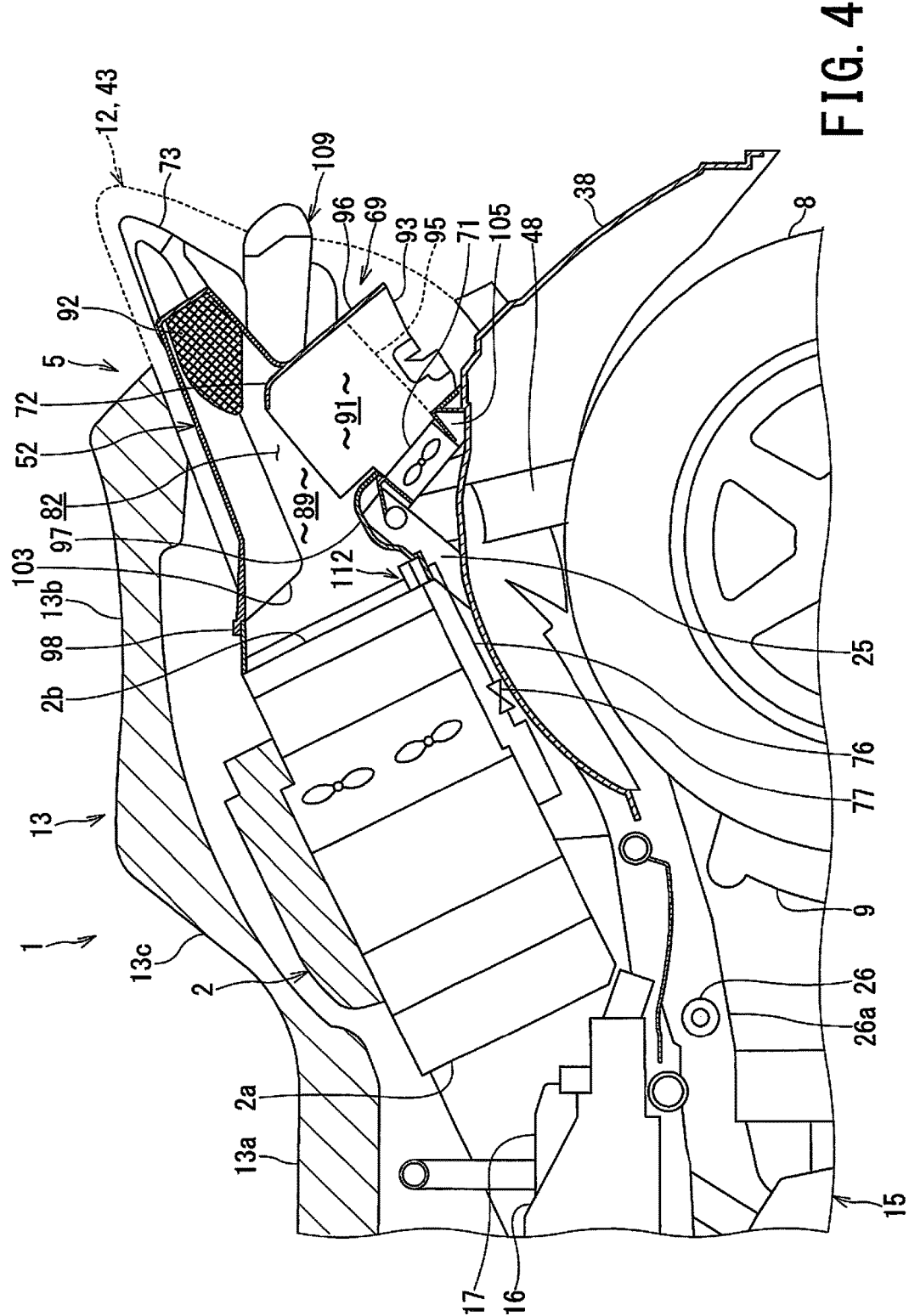
FIG. 4 is a longitudinal sectional view of an exhaust duct structure of the fuel cell vehicle according to the embodiment of the present invention.

FIG. 4 is a longitudinal sectional view of the exhaust duct structure of the fuel cell vehicle according to the embodiment of the present invention.

Figure 5:
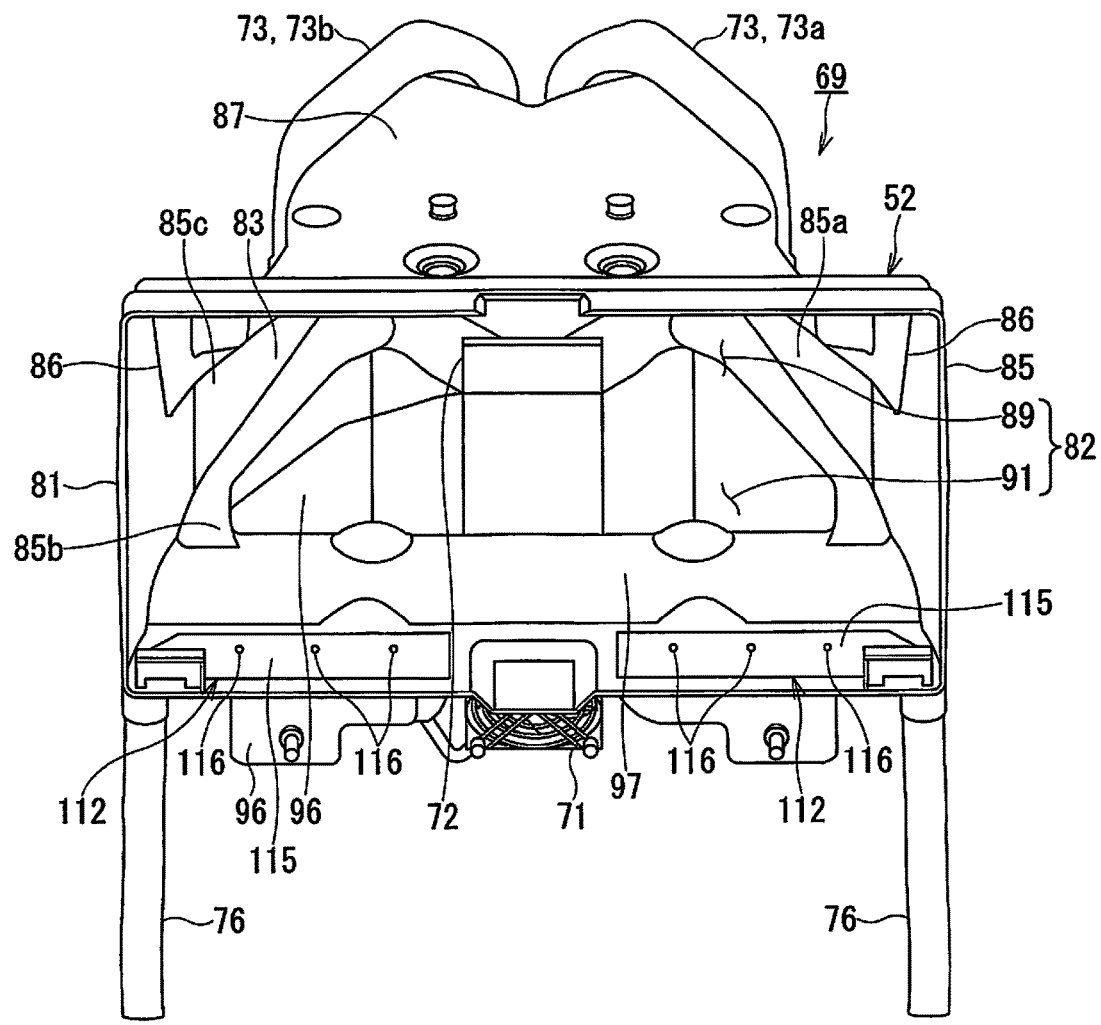
FIG. 5 is a front view of the exhaust duct of the fuel cell vehicle according to the embodiment of the present invention.

FIG. 5 is a front view of the exhaust duct of the fuel cell vehicle according to the embodiment of the present invention.

Figure 6:
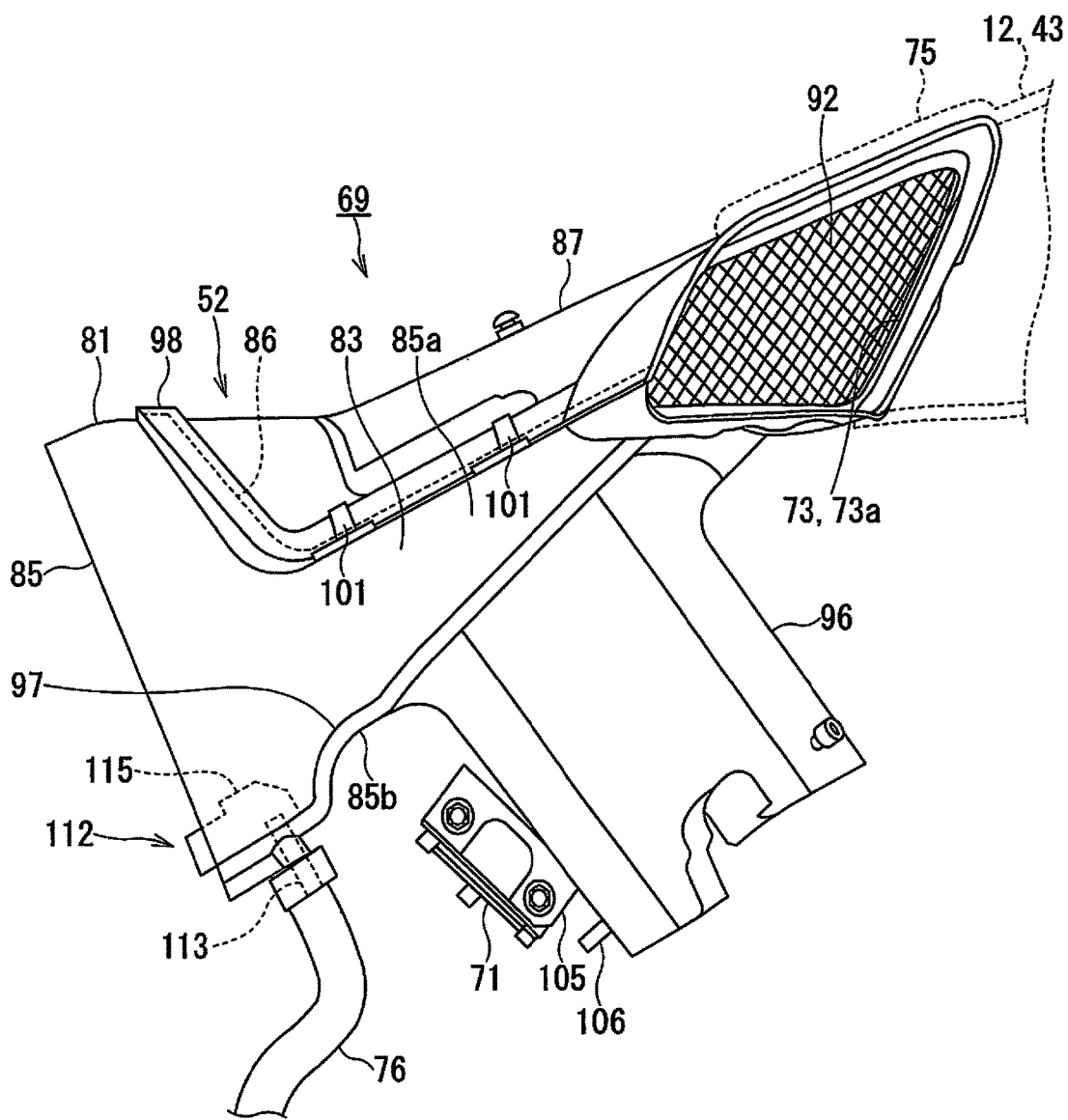
FIG. 6 is a left side view of the exhaust duct of the fuel cell vehicle according to the embodiment of the present invention.

FIG. 6 is a left side view of the exhaust duct of the fuel cell vehicle according to the embodiment of the present invention.

Figure 7:
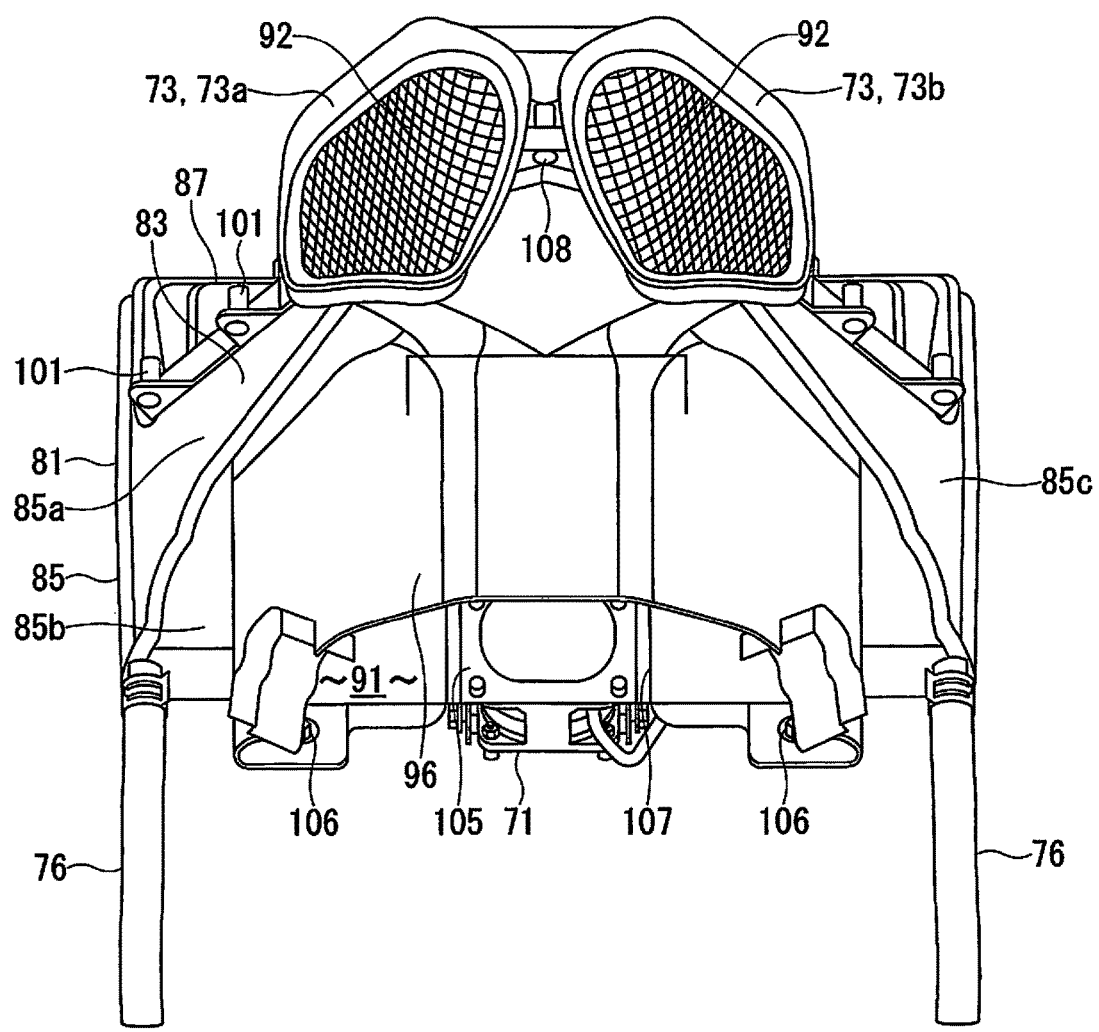
FIG. 7 is a rear view of the exhaust duct of the fuel cell vehicle according to the embodiment of the present invention.

FIG. 7 is a rear view of the exhaust duct of the fuel cell vehicle according to the embodiment of the present invention.

Figure 8:
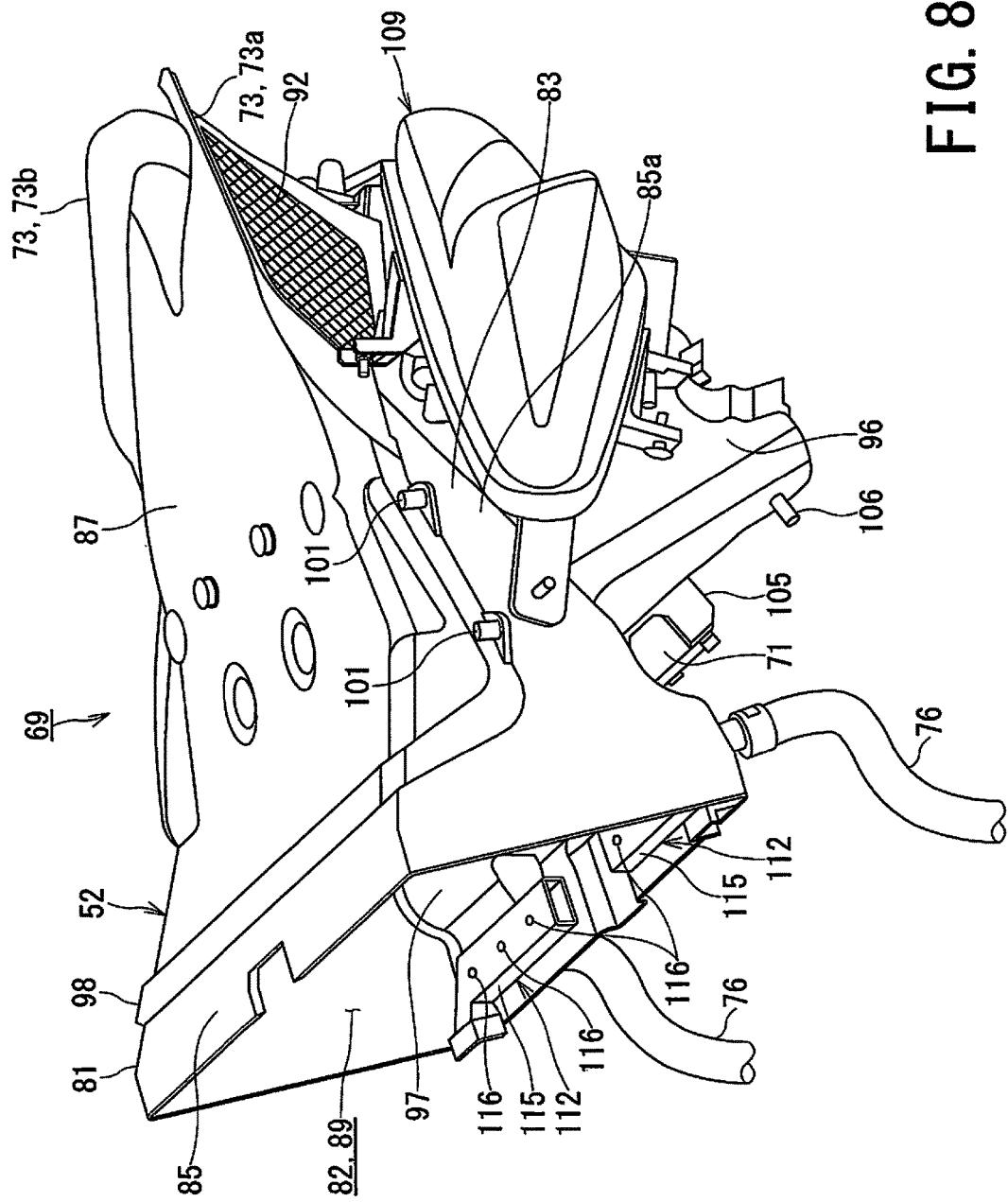
FIG. 8 is a perspective view of the exhaust duct of the fuel cell vehicle according to the embodiment of the present invention viewed from an obliquely left forward and upward direction.

FIG. 8 is a perspective view of the exhaust duct of the fuel cell vehicle according to the embodiment of the present invention viewed from an obliquely left forward and upward direction.

Figure 9:
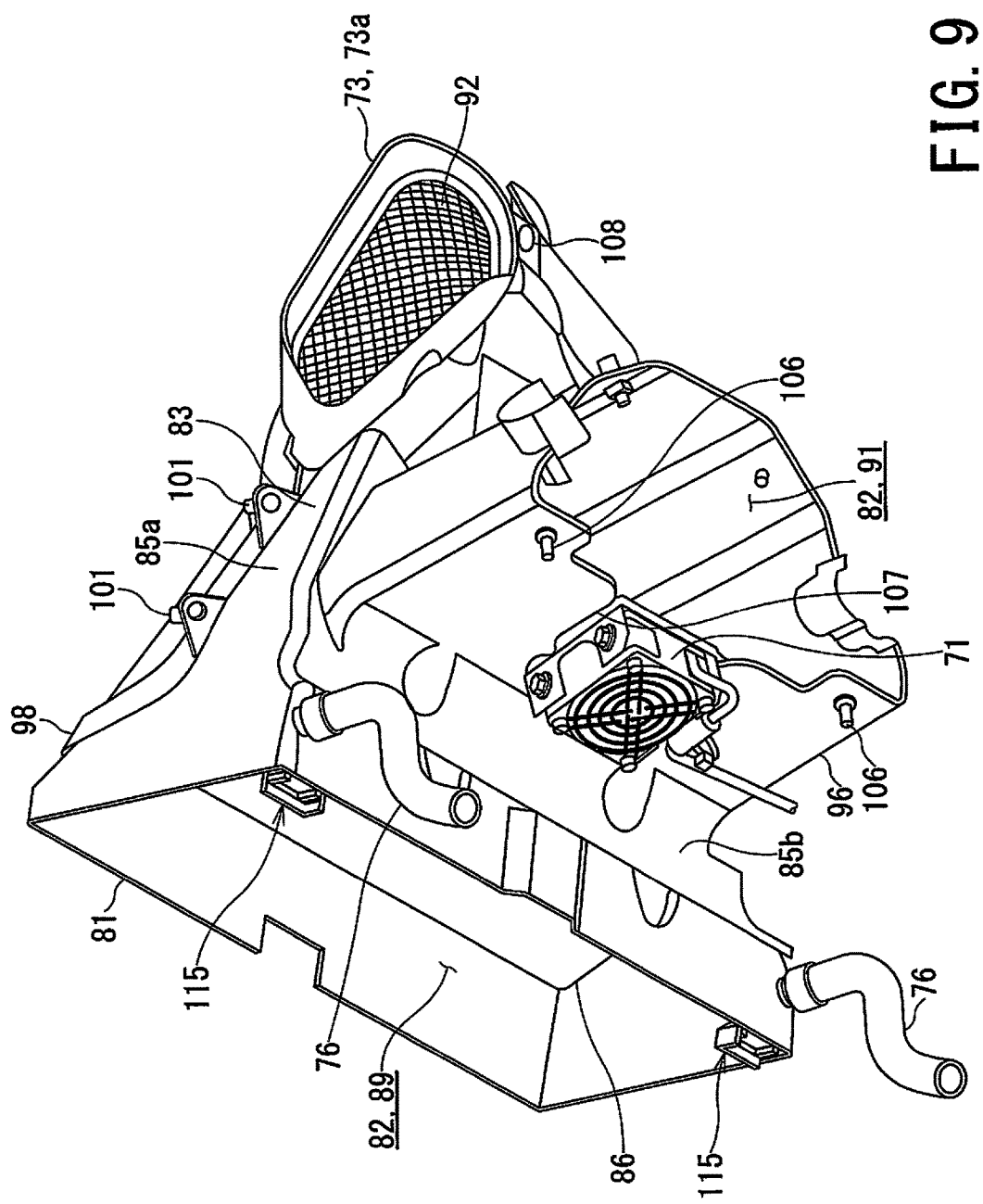
FIG. 9 is a perspective view of the exhaust duct of the fuel cell vehicle according to the embodiment of the present invention viewed from an obliquely left forward and downward direction.

FIG. 9 is a perspective view of the exhaust duct of the fuel cell vehicle according to the embodiment of the present invention viewed from an obliquely left forward and downward direction.

Figure 10:
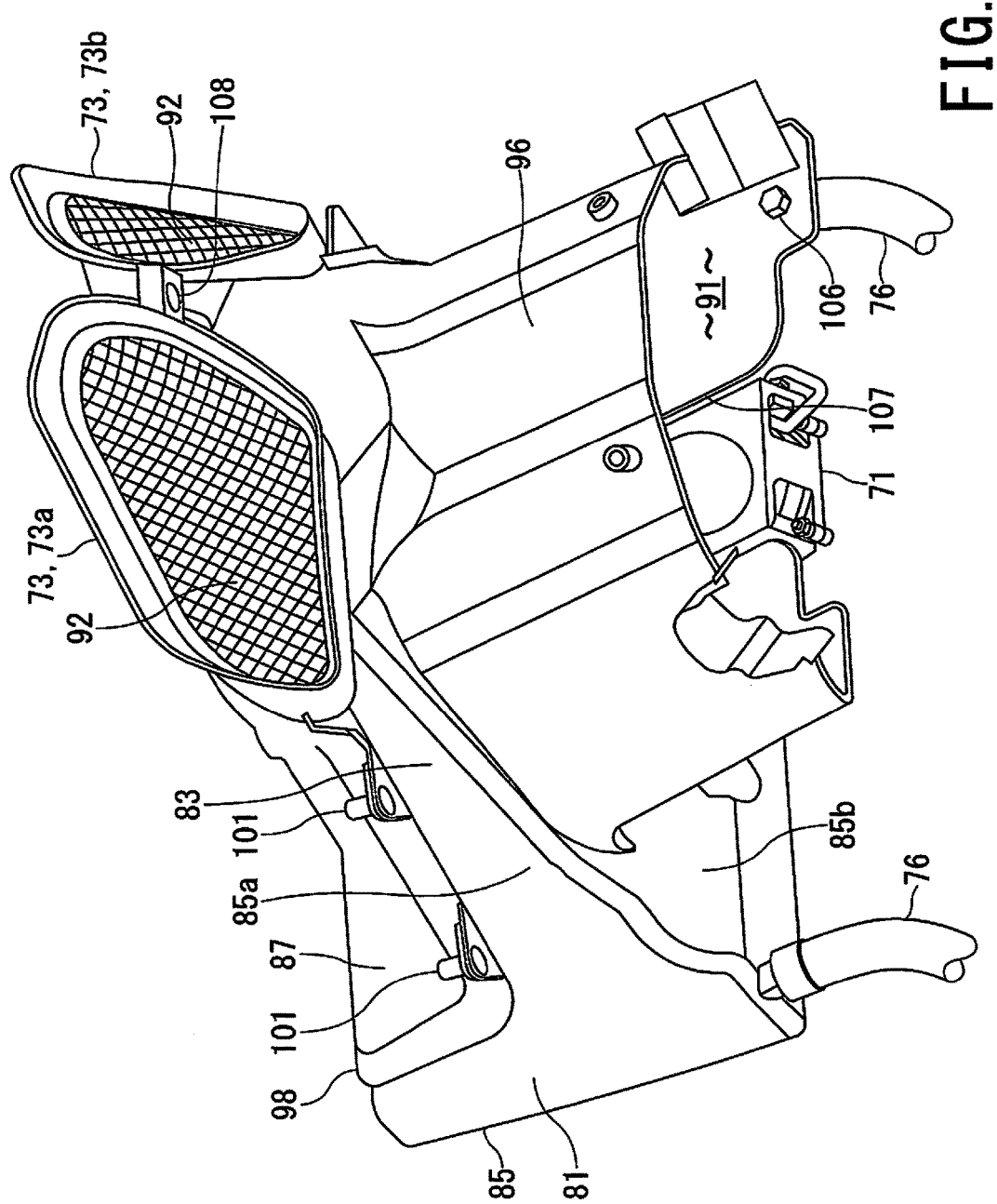
FIG. 10 is a perspective view of the exhaust duct of the fuel cell vehicle according to the embodiment of the present invention viewed from an obliquely left backward direction.

FIG. 10 is a perspective view of the exhaust duct of the fuel cell vehicle according to the embodiment of the present invention viewed from an obliquely left backward direction.

As shown in FIGS. 4 to 10, the exhaust duct structure 69 of the fuel cell vehicle 1 according to the present embodiment includes the vehicle body 5, the air-cooled fuel cell 2 mounted in the vehicle body 5 to generate power by allowing hydrogen gas and oxygen in air to react with each other, the exhaust duct 52 through which exhaust air of the fuel cell 2 is guided to a rear end of the vehicle body 5 and is discharged outside the fuel cell vehicle, and a dilution fan 71 guiding air into the exhaust duct 52 to dilute hydrogen in the exhaust duct 52.

The exhaust duct structure 69 includes a dilution accelerating wall 72 provided inside the exhaust duct 52 and facing the dilution fan 71 to disperse a flow generated by the dilution fan 71 into the exhaust duct 52 for acceleration of dilution of hydrogen.

The exhaust duct structure 69 includes an exterior 12 with which the vehicle body 5 is covered, and the exterior 12 has a first joint portion 75 fitted into at least one first exhaust port 73.

The fuel cell 2, for example, is a polymer electrolyte fuel cell (PEFC). The fuel cell 2 has at least one of cell stack including a large number of unit cells stacked with each other. Each of the unit cells includes an anode to which hydrogen is supplied, a cathode to which oxygen in air is supplied, and a laminate sandwiched between the anode and the cathode, the laminate including a dispersion layer, a catalytic layer, a solid polymer electrolyte film allowing a hydrogen ion to be selectively permeated, a catalytic layer, and a dispersion layer. The fuel cell 2 is an electrochemical system generating power using an electrochemical reaction between hydrogen supplied from the fuel tank 15 and oxygen contained air sucked through the intake port 2a, as well as water as a byproduct.

Surplus air after reaction with hydrogen and air having cooled cell stacks are discharged through the exhaust port 2b as exhaust air of the cathode.

Hydrogen is generally supplied to the anode via hydrogen supply piping (not illustrated), including a circulation path, according to consumption of hydrogen in the fuel cell. However, to prevent or reduce reduction in hydrogen concentration, caused by nitrogen that inevitably permeates the cell stack from an air path side, which is the cathode side, as a reaction of the fuel cell continues, and thus to prevent reduction in reaction efficiency due to the reduction in hydrogen concentration for steady power generation, and to discharge moisture produced by the reaction, the fuel cell 2 purges hydrogen gas from the anode into the exhaust duct 52 at regular intervals via a surplus hydrogen exhaust pipe 76 and an exhaust valve 77. That is, the fuel cell 2 includes the surplus hydrogen exhaust pipe 76 and the exhaust valve 77 to discharge unreacted surplus hydrogen into the exhaust duct 52.

The exhaust duct 52 discharges humid exhaust air, which is emitted from the fuel cell 2 during power generation, to the outside of the fuel cell vehicle 1, and dilutes and discharges hydrogen, which is emitted by hydrogen gas purge maintaining steady power generation of the fuel cell 2 and discharged into the exhaust duct 52, to the outside of the fuel cell vehicle 1. The exhaust duct 52 is a molding made of conductive resin.

The exhaust duct 52 is coupled to the exhaust port 2b of the fuel cell 2, and is coupled to the exterior 12 at the rear end of the vehicle body 5. The exhaust duct 52 includes a first duct member 85, and a second duct member 87 coupled to the first duct member 85.

The first duct member 85 integrally includes a rectangular cylindrical connection portion 81, and a first partition wall 83 partitioning a part of an exhaust air path 82. The connection portion 81 is air-tightly connected to the fuel cell 2.

The second duct member 87 is coupled to a rear portion of the connection portion 81 and the first partition wall 83 at a divided face 86 as a divided portion of a pair of sidewalls 85a and 85c facing each other among sidewalls 85a, 85b, and 85c partitioning the exhaust air path 82, thereby partitioning other portions of the exhaust air path 82.

That is, the exhaust duct 52 is vertically divided by the divided face 86 formed by the sidewalls 85a and 85c.

The exhaust air path 82 includes a first exhaust air path 89 extending from the connection portion 81 between the exhaust duct 52 and the fuel cell 2 to the rear end of the vehicle body 5, and a second exhaust air path 91 branching from an intermediate portion of the first exhaust air path 89 to extend downward.

The first exhaust air path 89 is connected to the exhaust port 2b of the fuel cell 2, and linearly extends upward to the rear end of the vehicle body 5. The first exhaust air path 89 has a wedge-shape narrowing vertically and horizontally from an upstream side connecting to the exhaust port 2b of the fuel cell 2 toward a downstream side, and has a substantially rectangular cross section of a flow channel. The first exhaust air path 89 includes a portion from the branching portion of the second exhaust air path 91 to the downstream side, having a lower reduction rate of a flow channel cross-sectional area than that in a portion from the upstream side to a branching portion of the second exhaust air path 91.

The first exhaust air path 89 includes at least one first exhaust port 73 opening toward the rear of the vehicle body 5. The at least one first exhaust port 73 has a right and left pair of exhaust ports 73a and 73b, opening toward the rear of the vehicle body 5. The pair of exhaust ports 73a and 73b branches in the shape of "V" on a downstream side (a rear side of the vehicle) from the branching portion of the first exhaust air path 89 and the second exhaust air path 91 to allow exhaust air in the exhaust duct 52 to smoothly and separately flow.

The first exhaust port 73 includes an electrically conductive first mesh filter 92. The first mesh filter 92 prevents foreign objects in a size of a few millimeters to a centimeter from entering the exhaust duct 52 while maintaining a smooth flow of exhaust air in the first exhaust port 73.

The second exhaust air path 91 hangs obliquely backward and downward along a tangential direction of the rear fender 38. The second exhaust air path 91 has a substantially uniform tube shape from the branching portion with the first exhaust air path 89 toward its lower end. The second exhaust air path 91 has a flow channel cross section in the shape of a trapezoid, narrowing on a rear side of the vehicle body 5. A width of the second exhaust air path 91 in a lateral direction of the vehicle body 5 is narrower than a lateral width of the first exhaust air path 89 at a connection portion to the first exhaust air path 89. The second exhaust air path 91 extends so as to project from a bottom face of the first exhaust air path 89, that is, the sidewall 85*b* partitioning the exhaust air path 82.

The second exhaust air path 91 includes the second exhaust port 93 opening obliquely backward and downward in the fuel cell vehicle 1 behind the rear fender 38 while avoiding the rear fender 38. The second exhaust port 93 is disposed in a negative pressure region caused during traveling of the fuel cell vehicle 1 behind the rear fender 38. Thus, when the fuel cell vehicle 1 travels, exhaust air in the second exhaust air path 91 is sucked through the second exhaust port 93 due to the negative pressure region behind the rear fender 38. That is, the second exhaust port 93 enables the exhaust air to effectively flow out. The second exhaust port 93 includes an electrically conductive second mesh filter 95. The second mesh filter 95 prevents foreign objects in a size of a few millimeters to a centimeter from entering the exhaust duct 52 while maintaining a smooth flow of exhaust air in the second exhaust port 93.

The first duct member 85 and the second duct member 87 work together to partition the first exhaust air path 89, and the first duct member 85 itself partitions the second exhaust air path 91. That is, the first duct member 85 partitions a part of the first exhaust air path 89 and the second exhaust air path 91, and the second duct member 87 partitions other portions of the first exhaust air path 89. The other portions of the first exhaust air path 89 are on an opposite side to the second exhaust air path 91, and in an upper portion of the first exhaust air path 89.

The first duct member 85 includes the continuous rectangular cylindrical connection portion 81 being provided at a most upstream portion connected to the fuel cell 2, the first partition wall 83 being connected to a downstream side of the connection portion 81 and partitions a lower half of the first exhaust air path 89 while reaching a rear end of the first duct member 85, a second partition wall 96 being in the shape of a tube and partitions the second exhaust air path 91. The connection portion 81 has a rectangular tube shape corresponding to the exhaust port 2*b* of the fuel cell 2, and has substantially flat vertical and horizontal walls. The connection portion 81 is very short in length as compared with overall length of the first exhaust air path 89. A gap between the connection portion 81 and the fuel cell 2, there is provided a seal material (not illustrated) sandwiched to air-tightly block.

The first partition wall 83 includes the sidewalls 85*a*, 85*b*, and 85*c* connected to the rear of the lower half of the connection portion 81 and partition the exhaust air path 82. The first partition wall 83, that is, the sidewalls 85*a*, 85*b*, and 85*c* form a tray shape opening upward. A lower half of the first exhaust port 73, that is, the right and left pair of exhaust ports 73*a* and 73*b* are partitioned at a rear end of the first partition wall 83.

The sidewall 85*b* of the first partition wall 83 is a bottom wall partitioning the bottom face of the first exhaust air path 89. In a boundary portion between the connection portion 81 and the sidewall 85*b*, there is provided a projecting portion 97, in an appropriate shape, projecting inside the exhaust duct 52 to avoid interference between the exhaust duct 52 and the frame 11. The projecting portion 97 has a recessed shape as viewed from the outside of the exhaust duct 52. The sidewall 85*b* has a central portion provided with an opening communicating with the second exhaust air path 91. The sidewall 85*b* is connected to the second partition wall 96 in the shape of a tube. The second partition wall 96 projects from the sidewall 85*b* to extend downward.

The second partition wall 96 is fixed to a duct fixing bracket 105 of the frame 11 with fasteners 106, for example bolts. The duct fixing bracket 105 also serves as a fixing bracket for the dilution fan 71 and the rear fender 38, and is provided between rear ends of the right and left upper frames 25.

The second duct member 87 is a lid detachably assembled from above in a portion of the first duct member 85 behind the connection portion 81. The second duct member 87 partitions a top face of the first exhaust air path 89 on a downstream side from the connection portion 81. The second duct member 87 works together with the sidewalls 85*a* and 85*c* of the first partition wall 83 to partition right and left side faces of the first exhaust air path 89 on a downstream side from the connection portion. An upper half of the first exhaust port 73, that is, the right and left pair of exhaust ports 73*a* and 73*b* are partitioned at a rear end of the second duct member 87.

The second duct member 87 includes a second joint portion 98 fitted to an edge portion of the first duct member 85 in the divided face 86 so as to cover the edge portion. A gap between the second duct member 87 and the first duct member 85, there is provided a seal material (not illustrated) sandwiched to air-tightly block. The second duct member 87 is detachably fixed to the first duct member 85 with appropriate fasteners 101, for example, bolts provided in the second joint portion 98. The second joint portion 98 has an inner surface allowing the second duct member 87 and the first duct member 85 to be coupled substantially flush or flat with each other.

The dilution fan 71 is provided in a lower portion of the exhaust duct 52, and is disposed in a posture for blowing rearward of the vehicle body 5. The dilution fan 71 has a width less than a lateral width in the lateral direction of the vehicle body 5 of the second exhaust air path 91, and is disposed in a central portion of the exhaust duct 52 in a width direction of the vehicle body 5 to be provided in a surface of a wall on a front side of the fuel cell vehicle 1 among the sidewalls partitioning the second exhaust air path 91. The wall surface on the front side is a part of the second partition wall 96 of the first duct member 85. The wall surface on the front side includes a cut-out portion 107 guiding air blown into the exhaust duct 52 from the dilution fan 71.

The dilution fan 71 is fixed in a posture for blowing toward a rear edge portion of the branching portion between the first exhaust air path 89 and the second exhaust air path 91. The dilution fan 71 feeds air between the rear fender 38 and the sidewall 85*b*, that is, bottom wall of the exhaust duct 52 into the second exhaust air path 91. That is, the dilution fan 71 feeds air in front of the second partition wall 96 toward the dilution accelerating wall 72 facing a slightly upstream side of the second exhaust air path 91.

The dilution accelerating wall 72 is provided in the rear edge portion of the branching portion between the first exhaust air path 89 and the second exhaust air path 91 in a boundary portion between the sidewall 85*b* and the second partition wall 96. The dilution accelerating wall 72 projects from the second partition wall 96 into the first exhaust air path 89 so that the second partition wall 96 of the second exhaust air path 91 extends upward. The dilution accelerating wall 72 has an upper end portion curving toward the front of the vehicle body 5, that is, the exhaust port 2b of the fuel cell 2.

The dilution accelerating wall 72 has a width less than a width of each of the first exhaust air path 89 and the second exhaust air path 91, in the width direction of the vehicle body 5. The dilution accelerating wall 72 is disposed in the central portion of the exhaust duct 52 so as to face the dilution fan 71. A portion between left edge of the dilution accelerating wall 72 and the sidewalls 85a has a distance, and a portion between right edge of the dilution accelerating wall 72 and the sidewalls 85c has a distance. This enables exhaust air of the fuel cell 2 to pass to a downstream side of the first exhaust air path 89 through both the right and left sides of the dilution accelerating wall 72.

The exterior 12 includes the frame cover 43 with which the rear end of the vehicle body 5 is covered, the frame cover 43 being provided with the first joint portion 75 being fitted to an opening edge of the first exhaust port 73 of the exhaust duct 52 so as to cover the opening edge. The first joint portion 75 has a similar structure to that of the second joint portion 98 between the first duct member 85 and the second duct member 87. The frame cover 43 is fixed to the exhaust duct 52 with a fastener 108, for example, bolt at a portion between the pair of exhaust ports 73a and 73b. The first joint portion 75 has an inner surface that allows the exhaust duct 52 and the frame cover 43 to be coupled substantially flush or flat with each other.

The exhaust duct structure 69 also includes a lighting device 109 disposed below the first exhaust air path 89 and behind the second exhaust air path 91.

The lighting device 109 is so-called a tail lamp, and is disposed at the branching portion between the first exhaust air path 89 and the second exhaust air path 91. The exhaust duct structure 69 allows the lighting device 109 to be disposed between the first exhaust air path 89 and the second exhaust air path 91 so as to be closer to the front of the vehicle body 5 as much as possible, thereby reducing overall length of the vehicle body 5.

The fuel cell 2 warms up at a low temperature by driving the fan to circulate exhaust air of fuel cell 2 while the intake shutter and the exhaust shutter are closed. This warm-up operation is called recirculation. During the recirculation, while discharging no exhaust air to the exhaust duct 52, the fuel cell 2 continuously purges hydrogen gas. That is, during the recirculation, while discharging no exhaust air to the exhaust duct 52, the fuel cell 2 continuously performs hydrogen gas purge with hydrogen concentration higher than that of the exhaust air.

Thus, the exhaust duct 52 includes a surplus hydrogen guide passage 112 through which surplus hydrogen is guided from the surplus hydrogen exhaust pipe 76 into the exhaust duct 52, the surplus hydrogen being guided to above the dilution fan 71 and on an upstream side of a flow of exhaust air in the exhaust duct 52. The surplus hydrogen guide passage 112 is provided in a lower portion of the connection portion 81 being an upstream portion of the exhaust duct 52. The fuel cell vehicle 1 allows the dilution fan 71 to be operated to reliably dilute surplus hydrogen during the recirculation.

The surplus hydrogen guide passage 112 communicates with the fuel cell 2 through a plurality of surplus hydrogen guide holes 113 penetrating a wall of the exhaust duct 52 to communicate with the surplus hydrogen exhaust pipe 76. The surplus hydrogen guide holes 113 are provided in an opening edge of a bottom face of the connection portion 81 of the exhaust duct 52. The surplus hydrogen guide holes 113 are provided on respective right and left sides of the bottom face of the connection portion 81.

The surplus hydrogen guide passage 112 is provided in the exhaust duct 52. The surplus hydrogen guide passage 112 is a part of a flow channel of surplus hydrogen guided into the exhaust duct 52 through the plurality of surplus hydrogen guide holes 113. The surplus hydrogen guide passage 112 includes a tunnel cover 115 working together with an inner surface of the exhaust duct 52 to guide surplus hydrogen to the central portion of the exhaust duct 52 in its width direction. The tunnel cover 115 constitutes a pair of tunnel covers 115 disposed along an opening edge of the connection portion 81 to cover the respective right and left surplus hydrogen guide holes 113, the pair of tunnel covers 115 each having an opening in an central portion of the exhaust duct 52. The tunnel cover 115 guides surplus hydrogen caused by hydrogen gas purge flowing through the surplus hydrogen guide hole 113 to a central portion in a width direction of the exhaust duct 52 to allow the surplus hydrogen to be discharged into the exhaust duct 52.

The tunnel cover 115 includes a plurality of exhaust holes 116 aligned in the width direction of the vehicle body 5. The exhaust holes 116 allow hydrogen to be discharged into the exhaust duct 52 while dispersing the hydrogen by effectively using overall width of the exhaust duct 52, along with an opening end of the tunnel cover 115, that is, the central portion of the exhaust duct 52.

The fuel cell vehicle 1 according to the present embodiment includes the dilution fan 71 guiding air into the exhaust duct 52 to dilute hydrogen in the exhaust duct 52, and thus ensures that the hydrogen is stirred and diluted to improve efficiency of discharging exhaust air to the outside of the fuel cell vehicle 1.

Further, the fuel cell vehicle 1 according to the present embodiment includes the dilution fan 71 being provided in a lower portion of the exhaust duct 52, and thus even if the dilution fan 71 fails and stops, hydrogen can be discharged from the first exhaust port 73 by preventing the hydrogen from flowing out to the outside of the fuel cell vehicle 1 through the dilution fan 71.

Further, the fuel cell vehicle 1 according to the present embodiment includes the dilution fan 71 being disposed to blow rearward the rear of the vehicle body 5, and thus air can be smoothly guided into the exhaust duct 52 without interfering with travelling wind, and also can be allowed to smoothly flow to the first exhaust port 73.

Further, the fuel cell vehicle 1 according to the present embodiment allows the dilution fan 71 to blow air to the dilution accelerating wall 72 in the exhaust duct 52, and thus dilution of hydrogen can be accelerated by generating a stirring flow in the exhaust duct 52.

Further, the fuel cell vehicle 1 according to the present embodiment includes the surplus hydrogen guide passage 112 guiding surplus hydrogen to above the dilution fan 71 and on an upstream side of a flow of exhaust air in the exhaust duct 52, and thus hydrogen discharged into the exhaust duct 52 by hydrogen gas purge can be reliably stirred and diluted while being sucked into a flow of air generated by the dilution fan 71.

Further, the fuel cell vehicle 1 according to the present embodiment includes the tunnel cover 115, and thus the hydrogen discharged into the exhaust duct 52 by the hydrogen gas purge can be more reliably guided to the dilution fan 71.

Further, the fuel cell vehicle 1 according to the present embodiment includes the tunnel cover 115 to have the plurality of exhaust holes, and thus dispersion of the hydrogen discharged into the exhaust duct 52 can be accelerated.

Therefore, the exhaust duct structure 69 of the fuel cell vehicle 1 according to the present invention ensures that hydrogen flowing into the exhaust duct 52 is diluted.

What is claimed is:

1. A fuel cell vehicle comprising:
    a vehicle body;
    an air-cooled fuel cell mounted in the vehicle body to generate power by allowing hydrogen gas and oxygen in air to react with each other;
    an exhaust duct through which exhaust air of the fuel cell is guided to a rear end of the vehicle body and is discharged outside the fuel cell vehicle; and
    a fan guiding air into the exhaust duct to dilute hydrogen in the exhaust duct,
    wherein the fuel cell includes a surplus hydrogen exhaust pipe discharging unreacted surplus hydrogen and the exhaust duct includes a surplus hydrogen guide passage through which the surplus hydrogen is guided from the surplus hydrogen exhaust pipe into the exhaust duct, the surplus hydrogen being guided to above the fan and on an upstream side of a flow of exhaust air in the exhaust duct, and
    wherein the fan is disposed in a central portion of the exhaust duct in a width direction of the vehicle body, the surplus hydrogen guide passage includes a tunnel cover covering a plurality of surplus hydrogen guide holes penetrating a wall of the exhaust duct to communicate with the surplus hydrogen exhaust pipe, the tunnel cover collecting the surplus hydrogen guided into the exhaust duct through the surplus hydrogen guide holes to collect the surplus hydrogen to a central portion of the exhaust duct in a width direction of the vehicle body, the tunnel cover including a plurality of exhaust holes.

2. The fuel cell vehicle according to claim 1, wherein the fan is provided in a lower portion of the exhaust duct, and is arranged to blow rearward of the vehicle body.

3. The fuel cell vehicle according to claim 1, further comprising:
    a dilution accelerating wall provided inside the exhaust duct and facing the fan to disperse a flow generated by the fan into the exhaust duct for acceleration of dilution of hydrogen.

4. The fuel cell vehicle according to claim 2, further comprising:
    a dilution accelerating wall provided inside the exhaust duct and facing the fan to disperse a flow generated by the fan into the exhaust duct for acceleration of dilution of hydrogen.

* * * * *